(No Model.)
E. HERRINGTON.
INSECT TRAP.
No. 378,788. Patented Feb. 28, 1888.
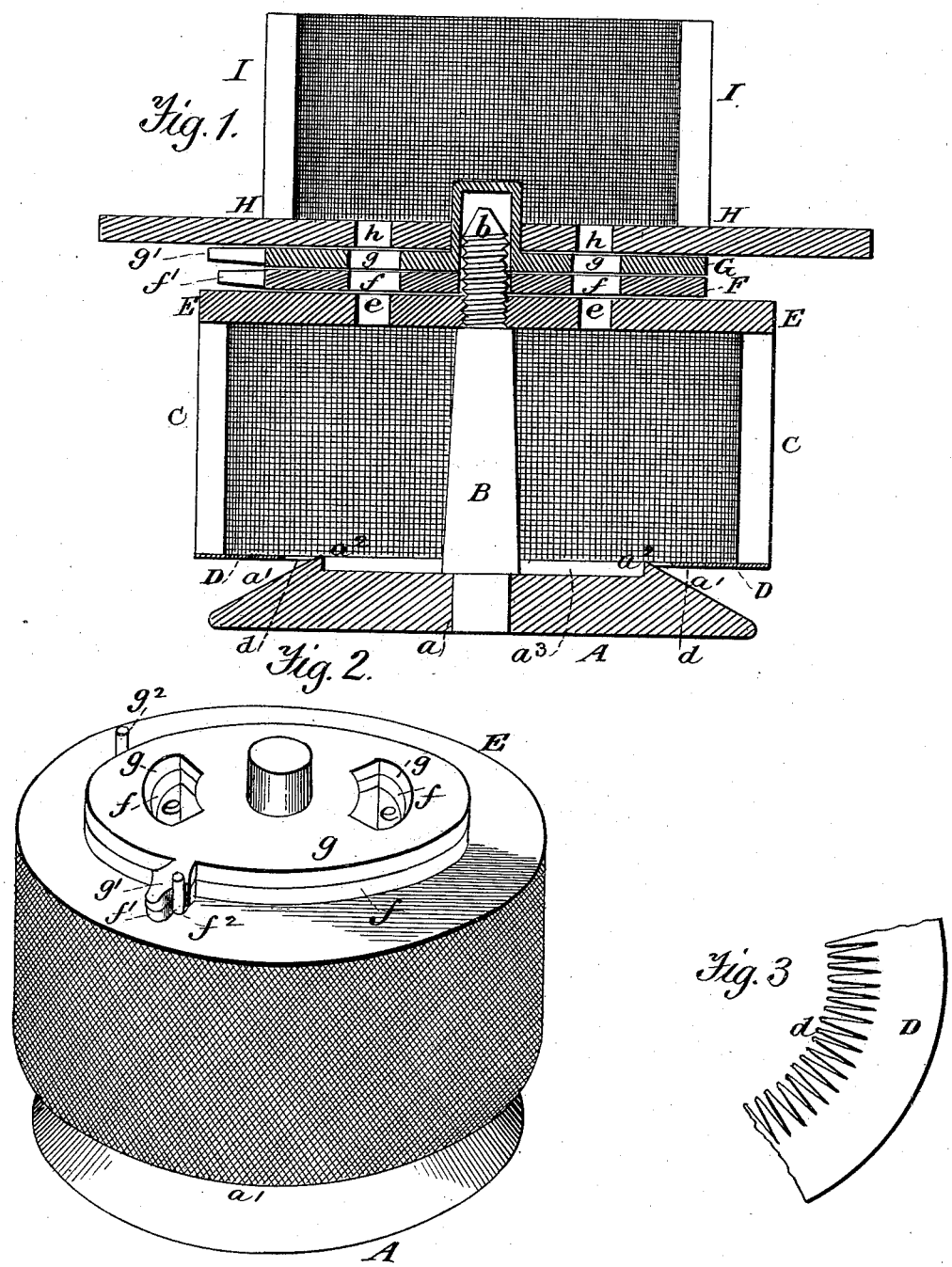
Witnesses.
A. Ruppert
Thomas P. Simpson
Inventor.
Ephraim Herrington

United States Patent Office.

EPHRAIM HERRINGTON, OF MOUNT VERNON, ASSIGNOR OF ONE-HALF TO M. M. BUSH, OF TOWNS, GEORGIA.

INSECT-TRAP.

SPECIFICATION forming part of Letters Patent No. 378,788, dated February 28, 1888.

Application filed September 14, 1887. Serial No. 249,701. (No model.)

*To all whom it may concern:*

Be it known that I, EPHRAIM HERRINGTON, a citizen of the United States, residing at Mount Vernon, in the county of Montgomery and State of Georgia, have invented certain new and useful Improvements in Insect-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a fly or insect trap in two connected chambers, so that the insects may pass up into the top section and the latter be removed without disturbing the trap.

Figure 1 of the drawings is a median sectional elevation; Fig. 2, a perspective view, and Fig. 3 a detail view, of the bottom plate of the bottom section.

In the drawings, A represents the base of trap with the central hole, $a$, inwardly inclined in an upward direction at $a'$, and having the top projecting edge, $a^2$. In the central hole, $a$, is tenoned the post B, which has a screw, $b$, at the upper end, so that the reticulated wire cylinder C may be adjusted higher or lower. The bottom of this cylinder is an annular plate, D, provided with inwardly-projecting teeth $d$, which approximate sufficiently close to the edge $a^2$ to deter the insects from trying to escape downwardly, but not enough to prevent them from crawling up the incline $a'$ to the bait, which is placed in the concavity $a^3$.

The cylinder C is provided with a cover, E, which has the holes $e$, with which register the turn-board holes $f\ g$ and the holes $h$ in the bottom H of the reticulated section I. This allows the insects to pass from one section through the turn-boards F G. By turning the board or plate F the insects in the lower section cannot pass out of the cylinder C, and by turning the board G, which is centrally swiveled in the bottom H, the insects in the top section or chamber cannot escape through said bottom. This having been done, the top section may be removed and immersed in water until the insects are drowned; or they may be destroyed in any other suitable manner.

The turn-boards F G have handles $f'\ g'$, which turn to or from the stops $f^2\ g^2$ on the top E of the cylinder C.

Having thus described all that is necessary to a full understanding of my invention, what I claim as new, and desire to protect by Letters Patent, is—

1. In an insect-trap, the base A, having the incline $a$ extending from the bottom up and inwardly to an edge, $a'$, in combination with the annular toothed plate D, projecting inwardly from and at right angles to the cylinder C, the top of said cylinder being adjustable on a central screw, as shown, whereby the teeth of plate D may be brought more or less close to the edge $a'$, as and for the purpose set forth.

2. In an insect-trap, the combination of the cover E, having holes $e$, the turn-boards F G, having holes $f\ g$ adapted to register therewith, and the independent upper chamber, I, having the bottom holes, $h$, adapted to register with holes $e\ f\ g$, as and for the purpose specified.

In testimony whereof I affix my signature in presence of two witnesses.

EPHRAIM HERRINGTON.

Witnesses:
  A. RUPPERT,
  THOMAS P. SIMPSON.